(12) United States Patent
O'Brien et al.

(10) Patent No.: US 10,733,444 B2
(45) Date of Patent: Aug. 4, 2020

(54) SYSTEMS AND METHODS FOR AUTOMATED ASSESSMENT OF PHYSICAL OBJECTS

(71) Applicant: Walmart Apollo, LLC, Bentonville, AR (US)

(72) Inventors: John Jeremiah O'Brien, Farmington, AR (US); Donald High, Noel, MO (US); Nicholas Antel, Springdale, AR (US); Chandrashekar Natarajan, San Ramon, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/632,946

(22) Filed: Jun. 26, 2017

(65) Prior Publication Data

US 2018/0018519 A1    Jan. 18, 2018

Related U.S. Application Data

(60) Provisional application No. 62/361,285, filed on Jul. 12, 2016.

(51) Int. Cl.
*G06K 9/00*      (2006.01)
*G06F 17/21*     (2006.01)
(Continued)

(52) U.S. Cl.
CPC ....... *G06K 9/00664* (2013.01); *G06F 17/218* (2013.01); *G06F 17/30047* (2013.01); *G06Q 30/018* (2013.01); *G06K 7/10861* (2013.01)

(58) Field of Classification Search
CPC ............... G06Q 30/0641; G06Q 50/30; G06Q 10/0832; G06Q 30/06; G06Q 30/0601; G06Q 10/0833; G06Q 40/04; G06Q 10/10; G06Q 30/02; G06Q 30/0267; G06Q 30/0275; G06Q 20/16; G06Q 30/0247; G06Q 30/0254; G06Q 30/0255; G06Q 30/0256; G06Q 30/0261; G06Q 30/0269;
(Continued)

(56) References Cited

U.S. PATENT DOCUMENTS 6,806,807 B2    10/2004    Cayne et al.
7,113,071 B2     9/2006    Cayne et al.
(Continued)

FOREIGN PATENT DOCUMENTS

WO    2003065151 A2    8/2003

OTHER PUBLICATIONS

International Search Report and Written Opinion from related international patent application No. PCT/US2017/039222 dated Sep. 13, 2017.
(Continued)

*Primary Examiner* — Aklilu K Woldemariam
(74) *Attorney, Agent, or Firm* — McCarter & English, LLP; David R. Burns

(57) ABSTRACT

Described in detail herein are methods and systems for performing a physical object assessment. The system entails an automated system to receive, unpack and assess a physical object based on automated determined attributes. The system can determine an element based on the assessment and generate a webpage including the attributes of the physical object and the determined element.

16 Claims, 8 Drawing Sheets

(51) Int. Cl.
  *G06F 17/30* (2006.01)
  *G06Q 30/00* (2012.01)
  *G06K 7/10* (2006.01)

(58) Field of Classification Search
  CPC ........... G06Q 30/0185; G06Q 30/0257; G06Q
          30/0277; B64C 2201/128; B64C
          2201/141; G05D 1/00; G08G 5/0069;
          G08G 5/0086; G08G 1/09685; G01C
          21/20; G01C 21/36; G06F 17/30867;
          G06F 17/30268; G06K 7/10861; G06K
          9/00664; G06K 9/00201; G06K 9/3208;
          G06K 9/4604; G06K 9/4661; G06K 9/52;
          G06K 9/6202; G06K 2209/17; G06K
          9/00; H04N 2201/3274; H04N 1/00;
          H04N 1/32122; H04N 1/32144; H04N
          1/32299; H04N 1/32325; H04N
          2201/323; H04N 2201/3235; H04N
          2201/3261; H04N 2201/3278; A47F
          11/10; A47F 2009/041; A47F 9/048;
          G06T 1/0021; G06T 1/0092; B25J 19/00;
          B25J 19/021; B25J 5/00; B25J 9/0093;
          B25J 9/1612; B25J 9/162
  USPC .... 382/100, 124, 141; 705/37, 28, 330, 338,
          705/600
  See application file for complete search history.

(56) References Cited

U.S. PATENT DOCUMENTS

| | | | |
|---|---|---|---|
| 7,610,233 | B1 | 10/2009 | Leong et al. |
| 7,945,470 | B1 | 5/2011 | Cohen et al. |
| 8,160,972 | B1 | 4/2012 | Tannenbaum |
| 8,554,694 | B1 | 10/2013 | Ward et al. |
| 9,066,206 | B2 | 6/2015 | Lin et al. |
| 9,202,191 | B2 | 12/2015 | Bowen et al. |
| 9,227,323 | B1 * | 1/2016 | Konolige ............... B25J 9/163 |
| 9,230,292 | B2 | 1/2016 | Amin et al. |
| 9,269,103 | B1 | 2/2016 | Kumar et al. |
| 9,305,310 | B2 | 4/2016 | Radhakrishnan et al. |
| 9,550,577 | B1 | 1/2017 | Beckman et al. |
| 9,573,684 | B2 | 2/2017 | Kimchi et al. |
| 9,639,908 | B1 | 5/2017 | Reiss et al. |
| 9,718,397 | B2 | 8/2017 | Kalanick et al. |
| 9,778,057 | B2 | 10/2017 | O'Mahony et al. |
| 9,805,536 | B2 | 10/2017 | Lutnick et al. |
| 9,811,838 | B1 | 11/2017 | Daire et al. |
| 9,852,551 | B2 | 12/2017 | Brinig et al. |
| 10,156,937 | B2 * | 12/2018 | Tretter ...................... G06F 3/14 |
| 2002/0198774 | A1 | 12/2002 | Weirich |
| 2005/0271246 | A1 * | 12/2005 | Sharma .............. G06Q 20/3823 382/100 |
| 2007/0061243 | A1 * | 3/2007 | Ramer .............. G06F 17/30905 705/37 |
| 2007/0061244 | A1 * | 3/2007 | Ramer .............. G06F 17/30867 705/37 |
| 2007/0091376 | A1 * | 4/2007 | Calhoon ............... G06T 1/0021 358/3.28 |
| 2008/0029005 | A1 | 2/2008 | Tajima et al. |
| 2009/0095047 | A1 * | 4/2009 | Patel ................. G06K 7/10722 73/1.01 |
| 2009/0152348 | A1 | 6/2009 | Ostrowski et al. |
| 2010/0030578 | A1 * | 2/2010 | Siddique ............ G06Q 10/0637 705/3 |
| 2010/0088175 | A1 | 4/2010 | Lundquist |
| 2012/0300974 | A1 * | 11/2012 | Rodriguez ......... H04N 1/32122 382/100 |
| 2013/0125517 | A1 | 5/2013 | Gomi |
| 2013/0223673 | A1 * | 8/2013 | Davis ...................... G06K 9/78 382/100 |
| 2014/0330738 | A1 | 11/2014 | Falcone et al. |
| 2015/0027740 | A1 | 1/2015 | Tuttle et al. |
| 2015/0120094 | A1 | 4/2015 | Kimchi et al. |
| 2015/0161667 | A1 | 6/2015 | Stevens et al. |
| 2015/0221021 | A1 | 8/2015 | Shakes et al. |
| 2016/0132925 | A1 * | 5/2016 | Durst, Jr. ............ G06Q 30/0255 705/14.53 |
| 2016/0196755 | A1 | 7/2016 | Navot et al. |
| 2016/0257401 | A1 | 9/2016 | Buchmueller et al. |
| 2017/0032382 | A1 * | 2/2017 | Shulman ................ G06Q 30/06 |
| 2017/0110017 | A1 | 4/2017 | Kimchi et al. |

OTHER PUBLICATIONS

Amazon.com, No Rush Shipping, What is No-Rush Shipping? Last viewed Dec. 2015.

Ebay, Office Furniture Store—Affiliate Online Business Website for Sale, last viewed Dec. 2015.

\* cited by examiner

SYSTEMS AND METHODS FOR AUTOMATED ASSESSMENT OF PHYSICAL OBJECTS

CROSS-REFERENCE TO RELATED PATENT APPLICATIONS

This application claims priority to U.S. Provisional Application No. 62/361,285 filed on Jul. 12, 2016, the content of which is hereby incorporated by reference in its entirety.

BACKGROUND

Un-packaging and assessing physical objects can be a slow error prone process. In addition, there can be a lack of verification which may cause the physical object to be inaccurately assessed.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein are methods and systems for automated physical object assessment. Embodiments of the methods and systems entail an automated system to receive, unpack and assess a physical object based on automated determined attributes. The system can determine an element based on the assessment and generate a webpage including the attributes of the physical object and the determined element.

In exemplary embodiments, a conveyer belt is configured to receive, support, and transport physical objects. The physical objects are associated with a machine-readable element encoded with identifiers corresponding to the physical objects. A scanner is disposed with respect to the conveyer belt and configured to scan the machine-readable elements of the physical objects and decode the machine-readable elements to extract the identifiers. An image capturing device disposed with respect to the conveyer belt and configured to capture images of the physical objects. A scale is operatively coupled to the conveyer belt and configured to determine weights of the physical objects.

A computing system, including a server and a database, can be operatively coupled to the scanner, the image capturing device, and the scale. The computing system can be programmed to query the database using the identifiers extracted from the machine-readable elements by the scanner to retrieve information regarding the physical objects from one or more tables in the database. The computing system extracts sets of attributes associated with the physical objects from the images of the physical objects and identifies elements associated with the physical objects based on the retrieved information regarding the physical objects, the sets of attributes associated with the physical objects and the weights of the physical objects. Furthermore, the computing system, can create webpages including the information, the sets of attributes associated with the physical objects, and the elements.

Figure 1:
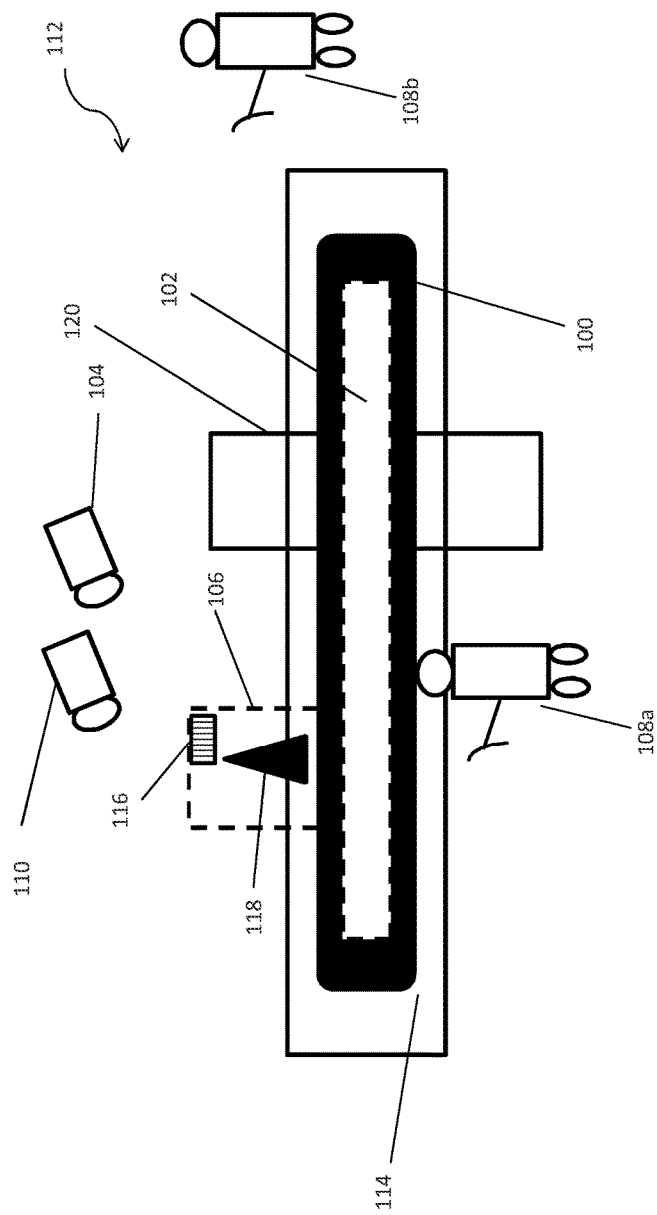
FIG. 1 is a block diagram of an exemplary physical object assessment system according to embodiments of the present disclosure.

FIG. 1 is a block diagram of an exemplary physical object assessment system 112 according to the present disclosure. The physical object assessment system 112 can provide an autonomous intake process for identifying and assessing physical objects and for automatically creating webpages for the physical objects based on the identification and assessment of the physical objects. The physical object assessment system 112 includes a conveyer belt 100, a scale 102, image capturing device(s) 104, a reader(s) 110, autonomous robot pickers 108a-b and an x-ray machine 120. The scale 102, the image capturing device(s) 104, the reader(s) 110, and the x-ray machine 120 of the physical object assessment system 112 can be in communication with one or more computing systems that can receive data from the scale 102, image capturing device 104, reader(s) 110, and an x-ray machine 120 to facilitate the intake and assessment processes described herein and to generated webpages for the physical objects that are processed via the intake and assessment processes. Exemplary computing systems are described herein, for example, with reference to FIGS. 2-5. In exemplary embodiments, the physical object assessment system 112 can receive packaged physical objects (e.g., physical object 118) on a conveyer belt 100, remove packaging from the physical objects and assess the physical objects based on attributes determined using an image capturing device 104, reader 110 and a scale 102 as the physical objects are transported by the conveyor belt 100. In exemplary embodiments, the physical objects can be enclosed in packaging and at least one machine-readable element can be affixed to the packaging enclosing each physical object. The physical objects (e.g., the physical object 118) enclosed in the packaging (e.g., packaging 106) can be associated with machine-readable elements (e.g., machine-readable element 116). The machine-readable elements can be encoded with identifiers corresponding to the physical objects enclosed in the packaging (e.g., the identifier encoded in the machine-readable element 116 affixed to the packaging 106 can correspond to the physical object 118 enclosed in the packing 106). The packaging 106 can be of different materials such as cardboard or plastic. The machine-readable element 116 can be a barcode, QR code, an/or an RFID tag.

The conveyer belt 100 can be formed by one or more belts operatively coupled to one or more belt cabinets 114, which may include rollers (e.g., friction and drive rollers) and a drive motor. The driver motor can control one or more of the rollers to rotate the belt to provide a transport for moving items along a length of the conveyer belt 100 from one end of the conveyer belt 100 to an opposite end of the conveyor belt 100. The image capturing device 104, the scale 102, the autonomous robot picker 108a, the reader 110, and x-ray machine 120 can be disposed at stations positioned at different locations along the length of the conveyor belt 100. The conveyor belt 100 can transport the physical object from station to station so autonomous intake and assessment processes can be implemented at the stations. For example, the conveyor belt 100 can transport the packaged physical object to a first station, which can include the reader(s) 110 to scan the packing for machine-readable elements; a second station, which can include the x-ray machine 120 to examine the contents in the packaging; a third station, which can include the autonomous robot picker 108a to unpack the physical object from the packaging; a fourth station, which can include a scale 102 to weigh the physical object after it is unpacked; and a fifth station, which can include the image capturing device(s) 104 to capture one or more images of the physical object.

Upon placing the packaged physical object 118 on the conveyor belt 100, the conveyor belt 100 can transport the packaged physical object 118 to the reader(s) 110. The reader(s) 110 can read the machine-readable element 116 affixed to the packaging 106 and can decode the machine-readable element 116 to extract the identifier. The reader(s) 110 can be disposed above or to a side of the conveyer belt 100 and/or can automatically move or be repositioned with respect to the conveyor belt 100 (e.g., can be operatively coupled to a track and can be moved waling the track). In some embodiments, the system can include a single reader 110 or multiple readers 110 at different positions and/or orientations to facilitate scanning of machine-readable elements located in different positions on packaging 106. In some embodiments, one or more mirrors can be disposed about the conveyor belt 100 at the station that includes the reader(s) 110. For embodiments in which the reader(s) are implemented as optical readers, the mirrors can be positioned to reflect light (e.g., infrared light) output by the reader(s) and/or reflected from one or more surfaces (e.g., a surface of the package) to read machine-readable elements disposed in different positions on packages. The reader(s) 110 can be configured to extract encoded information from machine-readable element 116 and decode the encoded information such as the identifier associated with the physical object 118. The identifier can be transmitted from the reader(s) 110 to one or more computing systems to facilitate intake and assessment of the packaged physical object 118. For example, the one or more computing systems can identify the physical object 118 that should be included in the packaging 106 based on the identifier received from the reader(s) 110 and can retrieve attributes associated with the physical object 118. If no machine-readable identifier is found on the packaging, an indication that the reader(s) 110 failed to read a machine-readable identifier can be transmitted to one or more computing systems.

The packaged physical object 118 can be transported from the station including the reader(s) 110 to the station including the X-ray machine 120 by the conveyor belt 100. The packaged physical object can be passed through the X-ray machine 120, which can detect the contents within the packaging 106 and can capture x-ray two-dimensional and three dimensional images of the contents of the packaging 106 from different perspectives, which can be used to determine whether the physical object 118 enclosed within the packaging 106 is missing and/or damaged and/or can be used to determine whether all of elements or components of the physical object are included in the packaging 106. For example, the x-ray images can be transmitted to one or more computing systems and the one or more computing system can compare the x-ray images to a set of x-ray images retrieved from one or more databases based on the identifier read by the reader(s) 110. When no identifier has been found (e.g., the reader(s) 110 fail to read a machine-readable element), the x-ray images can be used by the one or more computing systems to identify types of objects included in the packaging 106 and/or whether the physical object may be damaged. In response to a determination that the physical object is or may be damaged or is missing elements based on the x-ray images, the one or more computing system can transmit an alert and/or divert the package to another conveyor belt to be processed for return to the sender or for manual processing.

The packaged physical object 118 can be transported from the station including the X-ray machine 120 to the station including the autonomous robot picker 108b by the conveyor belt 100. The physical object 118 can be unpackaged by the autonomous robotic picker 108a. Furthermore, the physical object can be placed and removed from the conveyer belt 100 using the autonomous robot picker 108b. For example, the autonomous robot picker 108b can be in the at a front end of the conveyer belt 100 and/or the distal end of the conveyer belt 100 to place the physical object and/or to remove the package from the conveyer belt 100. The autonomous robot pickers 108a-b can be, but are not limited to, driverless vehicles, unmanned aerial vehicles (e.g., drones), and/or any other suitable autonomous robot configured to autonomously perform the functions, operations, and actions described herein. The autonomous robot picker 108a can detect the arrival of the packaged physical object 118 and remove the packaging 106 (e.g., using one or more articulated arms of the autonomous robot picker 108a).

The unpacked physical object 118 can be transported from the station including the autonomous robot picker 108b to the station that includes the scale 102. The scale 102 can be embedded in or under the conveyor belt 100 to weigh the unpacked physical object 118. The scale 102 can be an electronic weighing machine configured to determine a weight of the physical object 118 on the conveyor belt. The scale 102 can be an analog or digital scale that calculates the weight of objects using one or more strain gauges, piezoelectric devices, pressure sensors, or other suitable devices that can convert a force applied to the scale by an object (e.g., from gravity) to an electrical signal representative of the force. The output of the scale can be transmitted to one or more computing device to facilitate the intake and assessment processes described herein.

The unpacked physical object 118 can be transported from the station including the scale 102 to the station that includes the image capturing device(s) 104 by the conveyor belt 100. The image capturing device(s) 104 can be disposed with respect to the conveyer belt 100 to capture one or more images of the unpacked physical object 118. The image capturing device(s) 104 can be disposed above or to the side of the conveyer belt 100. In some embodiments, the system can include a single image capturing device 104 or multiple image capturing devices 104 at different positions and/or orientations to facilitate capturing images of the physical object at different orientations and positions. In some embodiments, the image capturing device 104 can be configured to move to capturing images of the physical object from different orientation and/or positions. The image capturing device 104 can be a camera and can capture still images or moving images of the physical object 118. The image(s) captured by the image capturing device(s) 104 can be transmitted to one or more computing system to facility the intake and assessment processes described herein.

In some embodiments, the physical object assessment system 112 can include ultraviolet light sensors (not shown) for inspection of artwork and collectibles (e.g., to identify forgeries and/or fraudulent works).

In some embodiments, the physical object assessment system can include molecular scanners (not shown) using a near-IR spectroscopy method to determine the contents of a physical object. The interaction of the vibration of molecules can be detected and referenced to a database of molecular compositions and vibrations. Using the detected vibration of the molecules the computing system 200 can determine the contents within the packaging. As a non-limiting example, molecular scanners can be used for determining the contents of the following physical objects: pharmaceuticals, food, beverages, art, collectibles, and jewelry.

Figure 2:
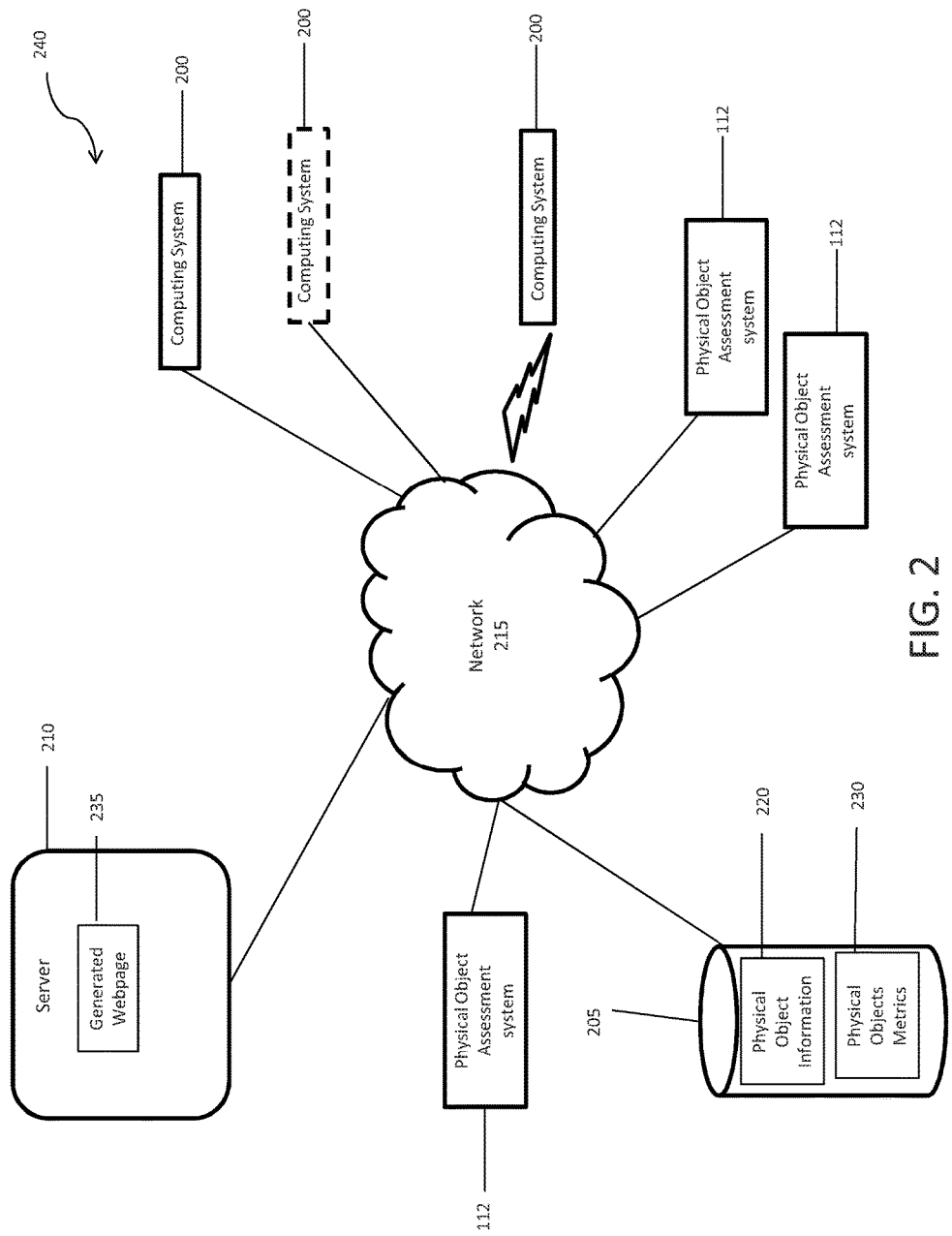
FIG. 2 illustrates an exemplary network environment of a computing system in accordance with embodiments of the present disclosure.

FIG. 2 illustrates an exemplary distributed computing system in a network environment 240. The environment 240 can include one or more computing systems 200, one or more servers 210, one or more databases 205 and one or more instances of the physical object assessment system 112. In exemplary embodiments, the computing systems 200 are in communication with the one or more computing systems 200, the one or more servers 210, the one or more databases 205 and the one or more instances of the physical object assessment system 112 can be in communication with each other via a communications network 215.

In an example embodiment, one or more portions of communications network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The one or more servers 210 includes one or more computers or processors configured to communicate with the one or more computing systems 200 and the one or more databases 205, via the network 215. The server(s) 210 can host one or more applications configured to interact with the one or more computing systems 200 and/or can facilitate access to contents of the one or more databases 205. The server(s) 210 can host webpages generated by the one or more computing systems 200 in accordance with embodiments described herein. The databases 205 may store information/data, as described herein. For example, the databases 205 can include a physical object information database 220 and physical object metrics database 230. The databases 205 and server 210 can be located at one or more geographically distributed locations from each other or from the computing system 200. Alternatively, the databases 205 can be included within server 210.

As a non-limiting example, the computing system 200 can receive the decoded identifier associated with a packed physical object (e.g., the physical object 118 shown in FIG. 1) from the readers of a first one of the physical object assessment systems 112 (e.g., the reader(s) 110 shown in FIG. 1), x-ray images of the packed physical object from the X-ray machine of the first one of the physical object assessment systems 112 (e.g., the X-ray machine 120 shown in FIG. 1), a measured weight of the unpacked physical object from the scale of the first one of the physical object assessment systems 112 (e.g., the scale 102 shown in FIG. 1), and image(s) of the unpacked physical object captured by the image capturing device of the first one of the physical object assessment systems 112 (e.g., the image capturing device 104 shown in FIG. 1).

The computing system 200 can query the physical object information database 220 using the decoded identifier to retrieve information associated with the physical object. The physical objects information database 220 can return a name of the physical object, type of the physical object, stored weight of the physical object, stored dimensions of the physical object, a date of manufacture of the physical object, a stored image of the physical object, a stored x-ray image of the physical object, and the value of the physical object at the date of manufacture.

The computing system 200 can extract a set of attributes associated with the physical object from the image using image/video analytics or machine vision on the received image of the physical object. The types of machine vision that can be implemented can include but are not limited to: Stitching/Registration, Filtering, Thresholding, Pixel counting, Segmentation, Inpainting, Edge detection, Color Analysis, Blob discovery & manipulation, Neural net processing, Pattern recognition, Barcode Data Matrix and "2D barcode" reading, Optical character recognition and Gauging/Metrology. The attributes can include but are not limited to: estimated dimensions of the physical object, a superficial condition of the physical object, or an age of the physical object.

The extracted attributes, the x-ray image and the weight of the physical objects can be compared to the information retrieved from the physical objects information database 220 to confirm and validate the physical object within the packaging is the same as the physical object identified by the identifier. For example, the computing system 200 can extract attributes such as dimensions of the physical object which can be compared to the stored dimensions. In response to matching the extracted dimensions to the stored dimensions the computing system 200 can confirm the physical object inside the packaging is the same as the physical object identified by the identifier. In another example, the computing system 200 can compare the weight captured by the scale or the x-ray images captured by the x-ray machine to the stored weight and the stored image of the physical object.

Subsequent to validating the physical object, the computing system can determine an element associated with the physical object. Based on the information retrieved from the physical objects information database 220, the attributes extracted from the image of the physical object and the weight of the physical object the computing system 200 can query the physical object metrics database 230 to determine the element associated with the physical object. The physical objects metrics database 230 can store elements associated with like physical objects with like attributes. The element can be stored in the physical object information database 220.

In some embodiments, the computing system can be unable to validate the physical object. The physical object can be damaged or incorrectly identified by the identifier. The extracted attributes, weight or x-ray image may not match the information retrieved from the physical objects information database 220 associated with the physical object. The autonomous robot device (e.g., autonomous robot device 108b shown in FIG. 1) can reroute the physical object to another conveyer belt for manual inspection.

In some embodiments, the physical object may not have an identifier labeled on the packaging or the reader(s) may not be able to read the identifier as the physical object is transported along the conveyer belt. The computing system 200 can extract attributes from the image received from the image capturing device. The computing system 200 can query the physical objects information database using the extracted attributes of the physical objects, the weight of the physical object received from the scale and x-ray of the physical objects to retrieve information associated with the physical object. The physical objects information database 220 can return a name of the physical object, type of the physical object, stored weight of the physical object, stored dimensions of the physical object, a date of manufacture of the physical object, and the value of the physical object at the date of manufacture. In response to receiving a predetermined threshold amount of information from the physical objects information database 220 the computing system 200 can validate the physical object. In response to not being able to receive a threshold of information from the physical objects information database, the physical object can be picked up by an autonomous robot picker and re-routed to a separate conveyer belt for manual inspection.

The computing system 200 can generate a webpage 235 in response to determining the element associated with the physical object. For example, the computing system 200 can execute an automated client-side and/or server-side script in response to determining the element associated with the physical object. The server-side scripts can be generated using server side languages such as ASP, ColdFusion, JavaScript, Perl, PHP, Ruby, WebDNA and other languages. The client-side scripts can be generated using client-side languages such as JavaScript or ActionScript. The webpage 235 can include the physical object information, the image of the physical object and the determined element of the physical object. The computing system 200 can receive input from a user associated with the element of the physical object and the element can dynamically change in the physical object information database 220 based on the input. In response to the element changing in the physical object information database 220, the webpage 235 can dynamically change the element on the webpage.

As a non-limiting example, the physical object assessment system 112 can be part of an automated online appraisal and sale/auction system. The facility can receive a packaged product a user wishes to place on sale in an auction, on a conveyer belt (e.g., the conveyer belt 100 shown in FIG. 1). The packaged product can have a machine-readable element affixed to the packaging, which can be encoded with an identifier associated with the product. The reader(s) 110 can scan and decode the machine-readable element and transmit the identifier to the computing system 200. The autonomous robot picker 108 can remove the packaging of the product and the image capturing device can capture an image of the product after it has been removed from the packaging. The image can be transmitted to the computing system 200. The scale can determine a weight of the product and transmit the weight to the computing system 200.

The computing system 200 can receive the identifier, the image and weight of the product. The computing system 200 can query the physical objects information database 220 using the identifier of the product to retrieve information about the product. The physical objects information database 220 can return name of the product, type of the product, model, brand, stored weight of the product, stored dimensions of the product, date of creation of the product, and the value of the product at the date of creation. For example, if the product is a printer, the computing system 200 can determine the name of the printer, the brand of the printer, the type of printer, model number, the year the model was created, the weight of the product at the time of creation, the size and dimensions of the product at the time of creation, and the retail price of the model of the printer when it was created.

The computing system 200 using image/video analytics can extract attributes from the image associated with the product. The attributes can include but are not limited to: estimated dimensions of the physical object, a condition of the physical object, or an age of the physical object. For example, continuing with the example of the printer as discussed above, the computing system 200 can determine the age and condition of the printer by comparing the estimated dimensions and the size and dimensions of the printer at the time of creation along with subtracting the current year with the date of creation of the printer. The age and condition of the printer can also be determined by comparing the determined weight received from the scale to the weight of the printer at the time of creation. Furthermore, the computing system 200 can extract from the image any marks, stains, hollow areas, paint chips or any other deterioration to the printer to determine the age and condition of the printer.

The computing system 200 can query the physical objects metrics database 230 to determine an appraisal value of the product. The computing system 200 can use the product information, the extracted attributes and the weight received from the scale to query the physical objects metrics database 230. The physical objects metrics database 230 can match the product information, extracted attributes, and weight with an associated appraisal value and return the appraisal value to the computing system 200. For example, continuing with the printer example as discussed above, the physical objects metrics database 230 can match the information associated with the printer, the attributes of the printer to an appraisal value and the weight of the printer with an appraisal value for printers with like information, attributes and weight. In other embodiments, the computing system 200 can calculate the appraisal value of the product by calculating the depreciation of the printer based on the information associated with the printer, the attributes associated with the printer and the weight of the printer.

In response to determining the appraisal value of the product the computing system can automatically generate an auction webpage 235, placing the product on sale in the auction. The webpage 235 can include the product information, the image of the product and the appraisal value of the product as the initial sale price. The sale price will be stored in the physical object information database 220.

In some embodiments, a user can place bid lower than the starting sale price of the product using the webpage 235. In response to receiving the bid lower than the starting sale price, the sale price stored in the physical objects database 220 can dynamically be lowered to the bid amount. The webpage 235 can reflect the change of the sale price in the physical objects database 220.

In other embodiments, a user can place a bid higher than the starting sale price of the product using the webpage 235. In response to receiving the bid higher than the starting sale price, the sale price stored in the physical objects database 220 can dynamically be increased to the bid amount. The webpage 235 can reflect the change of the sale price in the physical objects database 220.

In other embodiments, the webpage 235 is a sale webpage. The sale price does not change on the sale webpage 235.

Figure 3:
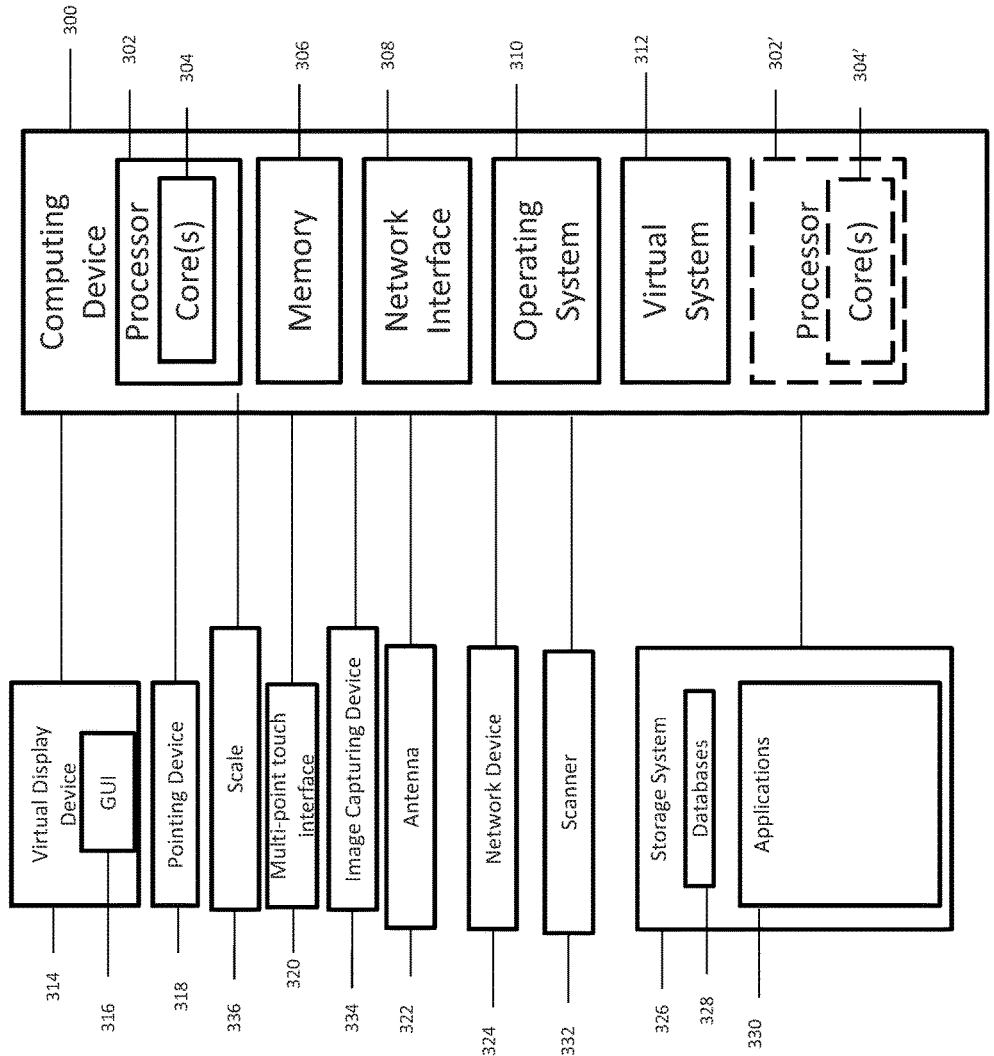
FIG. 3 illustrates an exemplary network environment of a computing system in accordance with embodiments of the present disclosure.

FIG. 3 is a block diagram of an example computing device for implementing exemplary embodiments of the present disclosure. Embodiments of the computing device 300 can implement embodiments of the automated physical object assessment system. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 406 may include other types of memory as well, or combinations thereof.

The computing device 300 can receive data from input/output devices such as, a scanner 332, an image capturing device 334, and a scale 336.

A user may interact with the computing device 300 through a visual display device 314, such as a computer monitor, which may display one or more graphical user interfaces 316, multi touch interface 320 and a pointing device 318.

The computing device 300 may also include one or more storage devices 326, such as a hard-drive, CD-ROM, or other computer readable media, for storing data and computer-readable instructions and/or software that implement exemplary embodiments of the present disclosure (e.g., applications). For example, exemplary storage device 326 can include one or more databases 328 for storing information regarding the physical objects. The databases 328 may be updated manually or automatically at any suitable time to add, delete, and/or update one or more data items in the databases. The databases 328 can include information such as physical object information 220 and physical object metrics 230.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
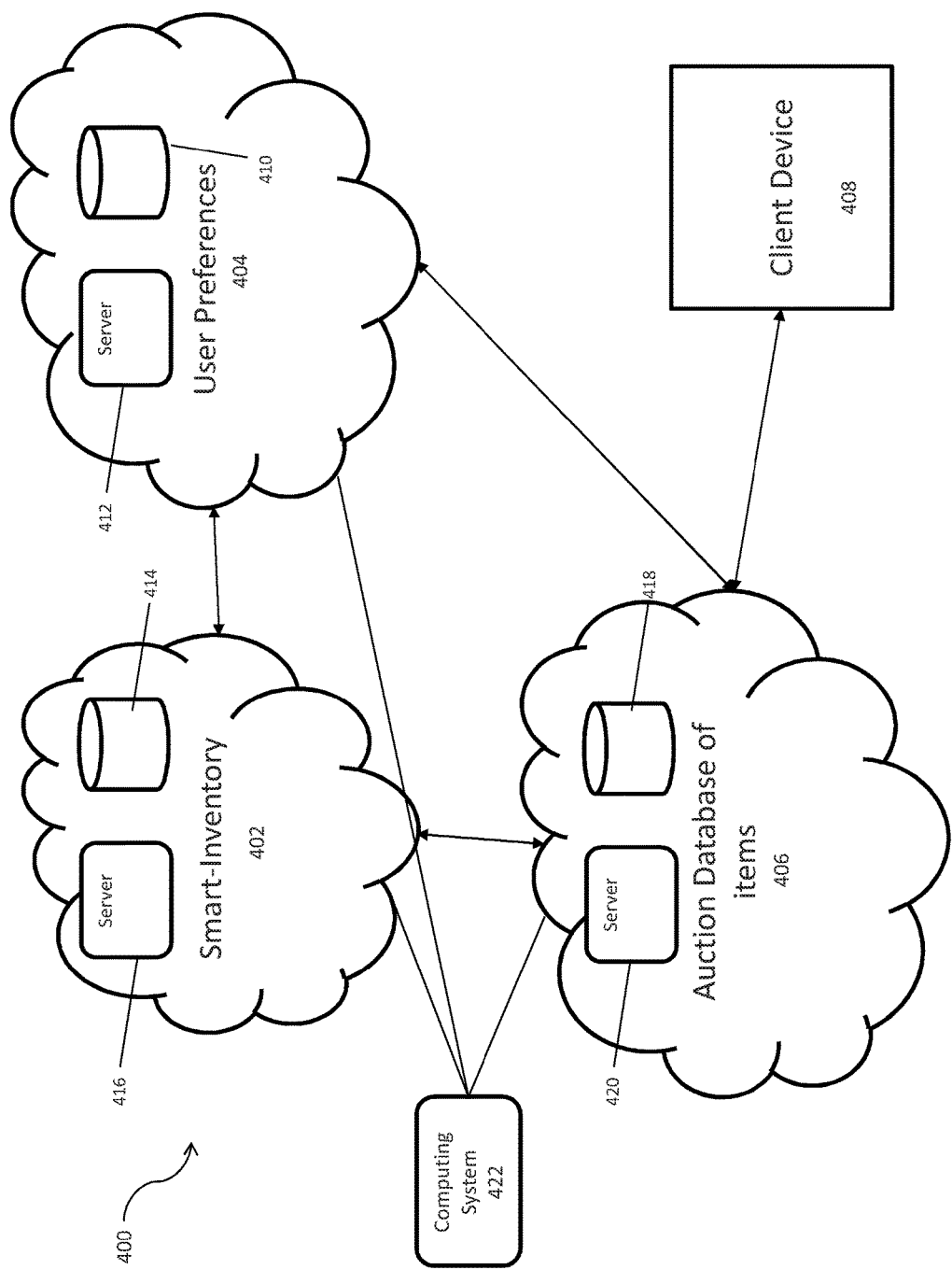
FIG. 4 illustrates a block diagram of the physical object assessment system embodied as part of a smart auction system according to embodiments of the present disclosure.

FIG. 4 is a block diagram of the physical object assessment system embodied as a smart auction system 400. The smart auction system 400 can include sensors disposed in a user's desired location, a user preferences cloud system 404, a smart inventory cloud system 402, an auction database of items cloud system 406 and a client device 408. The user preferences cloud system 404 can include one or more databases 410 storing the user preferences and one or more servers 412. The smart inventory cloud system 402 can include one or more databases 414 and a one or more servers 416. The auction database of items cloud system can include one or more databases 418 storing the products currently on auction and the associated information and one or more servers 420. The computing system 422 can implement at least one instance of the user preferences cloud system, the smart inventory cloud system and the auction database of items cloud system.

The sensors can be RFID readers disposed desired location in which products are stored and RFID tags can be affixed to the products. The sensing system can be a Passive Reader Active Tag (PRAT) in which the system has a passive reader which only receives radio signals from active tags. In other embodiments, the sensing system can be an Active Reader Passive Tag (ARPT) in which the system has an active reader, which transmits interrogator signals and also receives authentication replies from passive tags. In other embodiments, the sensing system can be an Active Reader Active Tag (ARAT) in which the system uses active tags awoken with an interrogator signal from the active reader.

A user can create their user preferences 404 in the database 410 for products preferred from the auction database 406 stored in the database 418. The server 414 in the smart inventory cloud system 402 can receive scans of RFID tags, scanned by the RFID readers. The a smart inventory cloud system 402 can determine products that need to be replenished based on the RFID readers determining and indicating a low inventory of particular products based on the fewer RFID tags scanned. The a smart inventory cloud system 402 can generate a list of products from the auction's database 406 based on the products for which the inventory is low cross-referenced with the user preferences 404. The list of products can be parsed into messages and sent to the client device 408. The messages will include information on products for which the user will be able to submit bid(s) for products. The user will be presented with information on the lowest-or-best deals for products for which the inventory is low. The user can be notified when a desired quantity of products are available in the auction database of items 406. In some embodiments, the smart auction system 400 can automatically purchase the products on the generated list and have it delivered to the user's address. In other embodiments, the user may selectively purchase the products on the generated product list. In some embodiments, the auction database of items 406 can determine products similar to the ones needed by the user.

In some embodiments, the sensors can be image capturing devices disposed at the desired location so that the user's products are in view of the image capturing devices. The image capturing devices can capture images of the products and transfer the images to the server 414 in the smart inventory cloud system 402. The server 414 can execute a video recognition application which uses video analytics to determine inventory of a particular product.

As a non-limiting example, a user can store bottles of laundry detergent in a storage room affixed with RFID tags. RFID readers can be disposed in the storage room. The bottles can be removed as they are used, causing fewer RFID tags being read by the RFID readers. The laundry detergent can be linked to a user's smart-inventory cloud system 402. The smart inventory cloud system 402 can detect low-inventory of the laundry detergent based on fewer RFID tags read by the RFID readers. The smart inventory cloud system 404 can query the laundry detergents on the auction inventory database of items 402 and further cross-reference the preferred laundry detergents with the user's preferences to generate a list of possible laundry detergents for purchase. The smart auction system 400 will present the list of possible laundry detergents for purchase to the user. In some embodiments, the user can selectively purchase the desired laundry detergent. In other embodiments, the smart auction system 400 can automatically purchase the desired laundry detergent.

Figure 5:
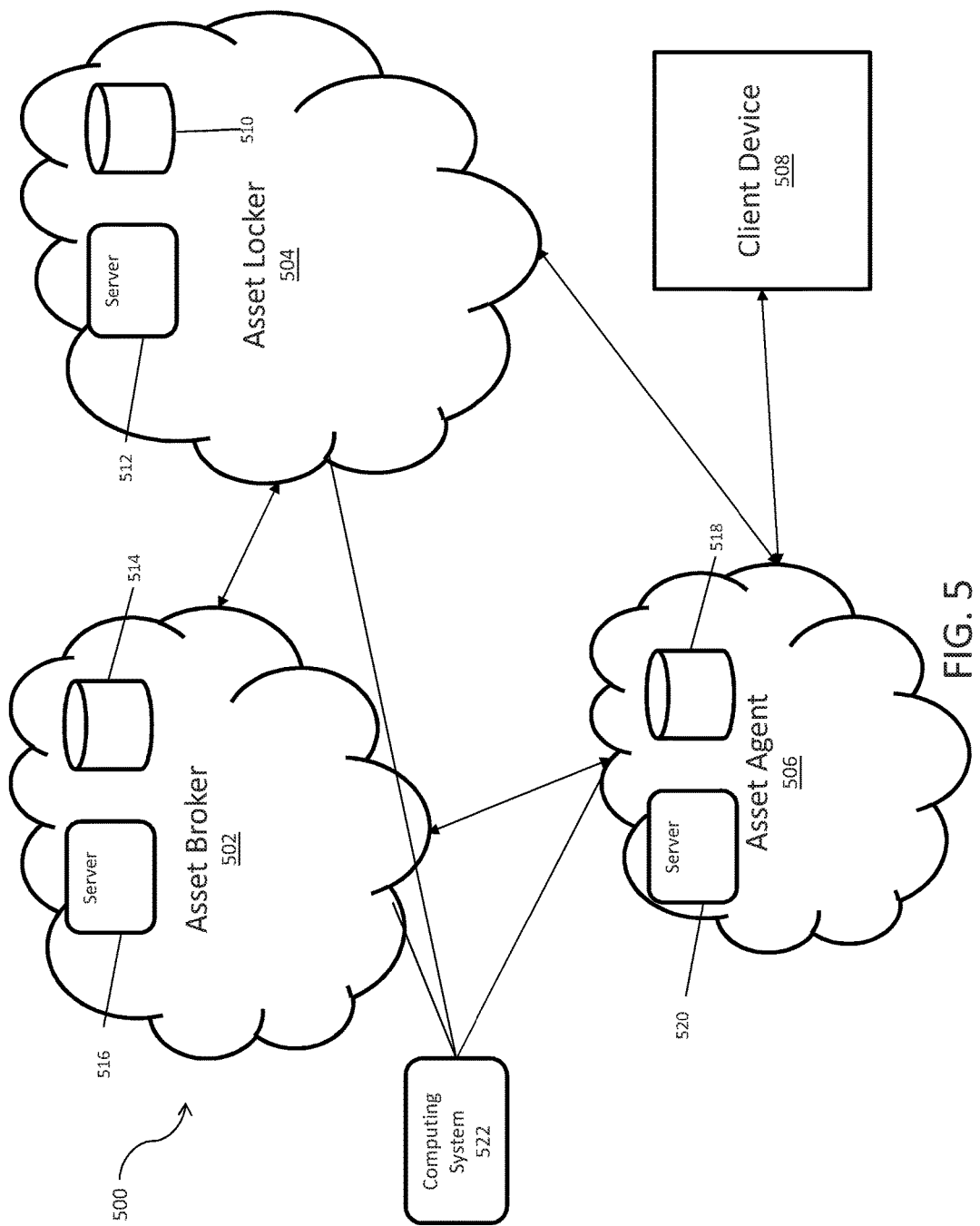
FIG. 5 illustrates a block diagram of the physical object assessment system embodied as an auction system using decentralized currency according to embodiments of the present disclosure.

FIG. 5 illustrates a block diagram of the physical object assessment system embodied as an auction system using decentralized currency according the present disclosure. The auction system using decentralized currency 500 can include an asset broker 502, an asset agent 504, an asset locker 506 and a client device 508. The asset broker 502 can be a cloud system including a one or more databases 510 and one or more servers 512. The asset locker 504 can be a cloud system including one or more databases 514 and one or more servers 516. The asset agent 506 can have one or more database 518 and one or more servers 520. A computing system 522 can implement at least one instance of the asset broker 502, asset locker 504 and asset agent 506. As a non-limiting example, a user can transfer currency from the financial institution to the asset locker 506. A user can submit bid on a product on auction using the client device 508. Currency is withheld or prevented from dissipating their assets from the user's asset locker 506. If the user loses the bid, the currency is distributed or allowed to dissipate the assets from the user's asset locker 506. If the user wins the bid, the withheld currency is distributed to the auctioneer and/or seller. In another embodiment, if the client wins the bid, the frozen currency is distributed and frozen within the auctioneer's or seller's Asset Locker until product has been received by the user. In some embodiments, if the user does not win the bid, the user can be presented recommended products similar to the product bid on by the user.

Figure 6:
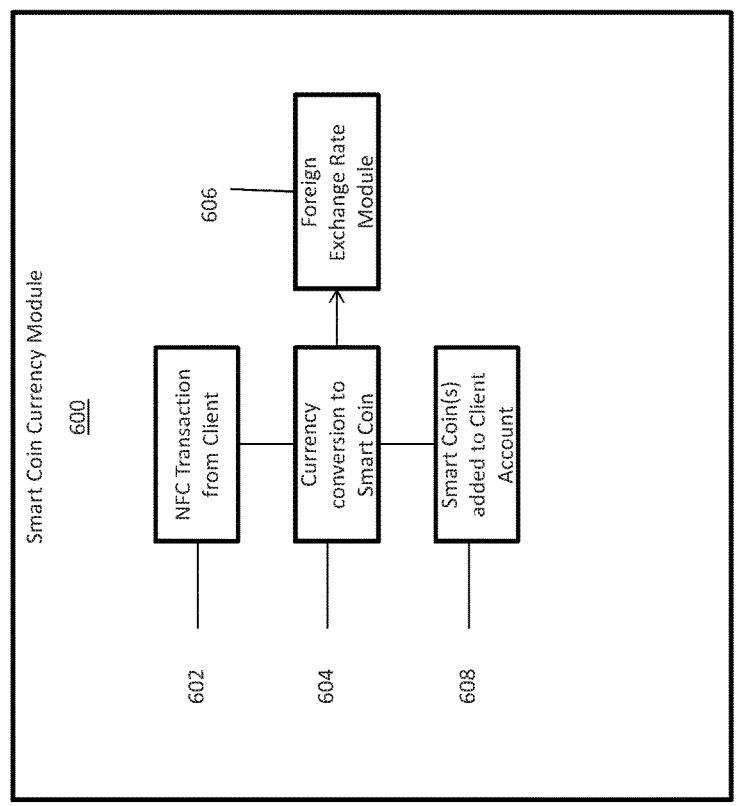
FIG. 6 illustrates a block diagram of the smart coin system of the auction system using decentralized currency according to embodiments of the present disclosure.

FIG. 6 illustrates a block diagram of the smart coin system of the auction system using decentralized currency according to the present disclosure. The auction system using decentralized currency can use smart coins as currency used for the auction. In exemplary embodiments, the smart coin module 600 can receive a request for a NFC transaction from a user 602. The smart coin module 600 can convert the currency 604 deposited by the user into smart coin using a foreign exchange module 606. The smart coin module can deposit the exchanged currency in the user's asset locker (e.g. user's asset locker 506 shown in FIG. 5).

Figure 7:
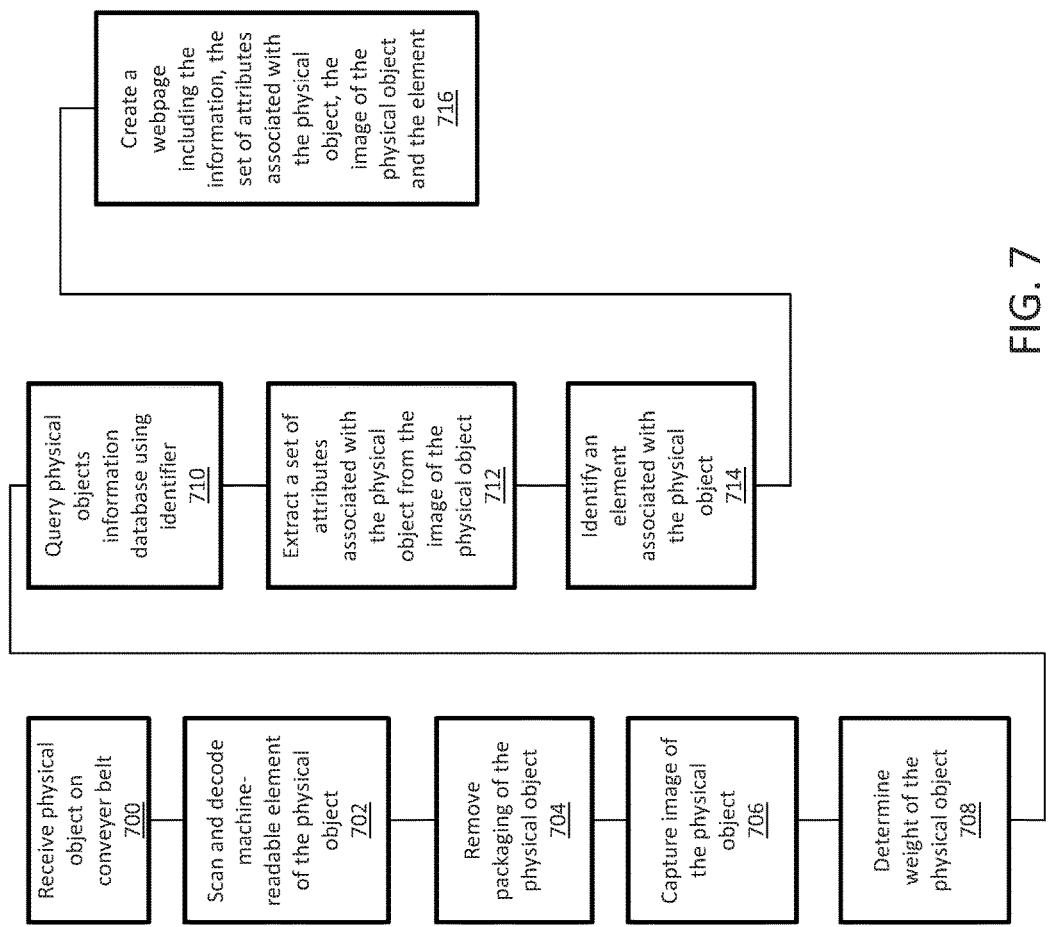
FIG. 7 is a flowchart illustrating the physical object assessment system according to embodiments of the present disclosure.

FIG. 7 illustrates a flowchart of the physical object assessment system according to the present disclosure. In operation 700, a conveyer belt (e.g., the conveyor belt 100 shown in FIG. 1) receives, transports, and supports, a physical object (e.g., the physical object 118 shown in FIG. 1). As mentioned above, the conveyer belt 100 can include stations along the length of the belt. A first station can be a there can be an optical scanning station using a reader (s) (e.g., the reader(s) 110 shown in FIG. 1), a second station can be x-ray machine (e.g., the x-ray machine 120 shown in FIG. 1), at a third station there can be a unpacking station by an autonomous robot picker (e.g., the autonomous robot picker 108a shown in FIG. 1), at a fourth station a scale (e.g., the scale 102 shown in FIG. 1), and at a fifth station there can be an image capturing station using an image capturing device (e.g., the image capturing device 104 shown in FIG. 1). The physical object is associated with a machine-readable element (e.g., the machine-readable element 116 shown in FIG. 1) encoded with an identifier corresponding to the physical object. The physical object is enclosed in packaging (e.g., the packaging 106 shown in FIG. 1). The machine-readable element is affixed to the packaging of the physical object. The machine-readable element can be a barcode or QR code.

In operation 702, a reader(s) disposed with respect to the conveyer belt, scans the machine-readable element and decodes the identifier encoded within the machine-readable element. The reader(s) can be an optical scanner configured to read barcodes or QR codes.

In operation 704, an autonomous robot picker removes the packaging from the physical object. In operation 706, an image capturing device disposed with respect to the conveyer belt, captures an image of the physical object. The image capturing device can capture a moving image or a still image of the physical object.

In operation 708, a scale coupled to the conveyer belt, determines the weight of the physical object.

In operation 710, a computing system (e.g., the computing system 200 shown in FIG. 2) operatively coupled to the reader(s), image capturing device and scale queries the physical objects information database (e.g., the physical objects information database 220 shown in FIG. 2) using the identifier extracted from the machine-readable element by the reader(s) to retrieve information regarding the physical object. In operation 712, computing system extracts a set of attributes associated with the physical object from the image of the physical object using video analytics. In operation 714, the computing system identifies an element associated with the physical object based on the retrieved information regarding the physical object, the set of attributes associated with the physical object and the weight of the physical object. In operation 716, the computing system creates a webpage including the information, the set of attributes associated with the physical object, the image of the physical object and the element.

Figure 8:
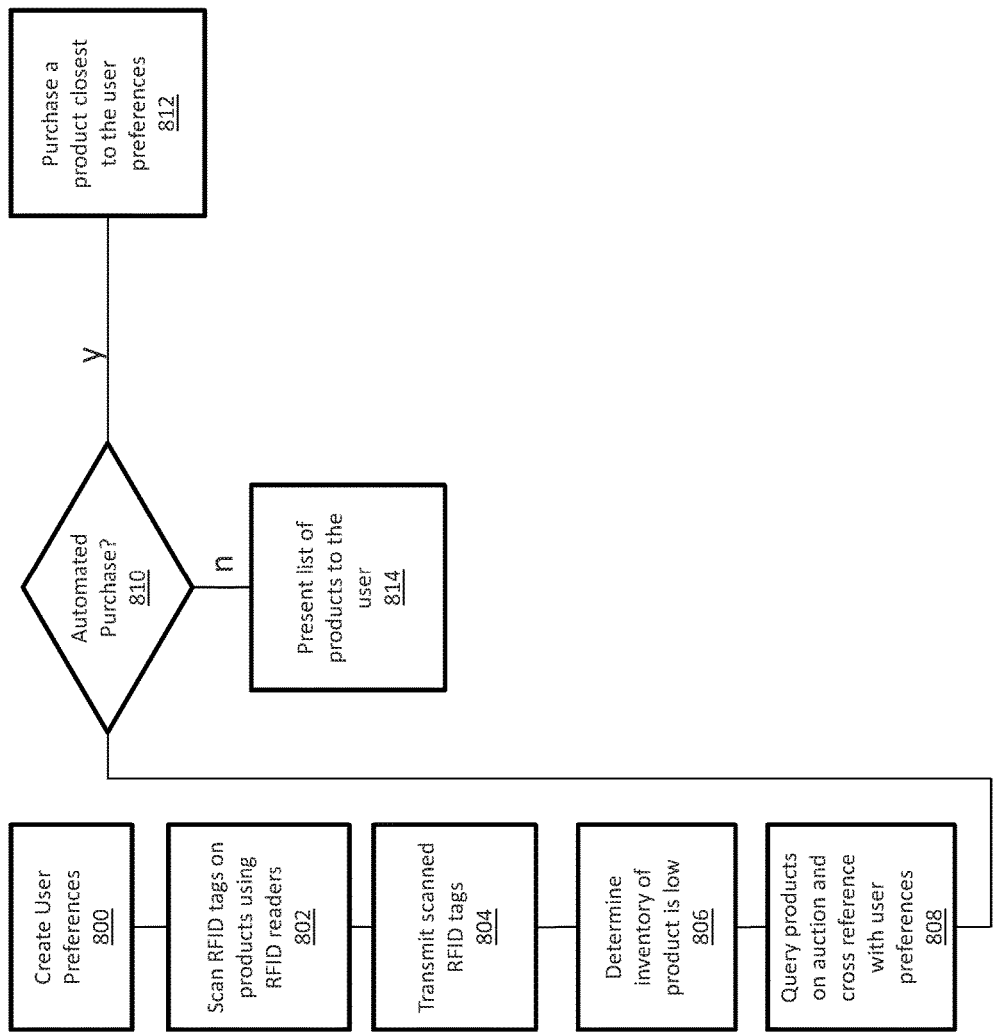
FIG. 8 is a flowchart illustrating the smart auction system according to the present disclosure.

FIG. 8 illustrates a flowchart of the smart auction system according to the present disclosure. In operation 800, the user can create user preferences for desired products from the database (e.g., the database 418 shown in FIG. 4) of the auction database of items cloud system (e.g., the auction database of items cloud system 406 shown in FIG. 4). The user preferences can be stored in the database (e.g., the database 410 shown in FIG. 4) of the user preferences cloud system (e.g., user preferences cloud system 404 shown in FIG. 4). The products in the database of the auction database of items cloud system can be placed on auction using the physical object assessment system (e.g., physical object assessment system 112 shown in FIG. 1).

In operation 802, RFID readers can read RFID tags affixed on products in a specific location. In the smart auction system, RFID readers can be disposed in a particular location in which products for which the user desires to monitor inventory for are disposed. The product can be affixed with RFID tags.

In operation 804, the RFID readers can transmit the scanned RFID tags to the smart inventory cloud system (e.g., smart inventory cloud system 402 shown in FIG. 4). The smart inventory cloud system can keep track of the inventory of the products based on the received scans.

In operation 806, the smart inventory cloud system can determine a product has low inventory based on the received scans. In operation 808, the smart inventory cloud system can query the database of the user preferences cloud system to retrieve a list of preferred products. The smart inventory cloud system can cross-reference the list of preferred products with the products on sale in the auction database of items cloud system. The smart inventory cloud system can generate a short list of products based on the cross references. The smart inventory cloud system can rank the short list of products based on closest matched product to the product needing replenishment and based on the number of products needed.

In operation 810, the smart inventory cloud system can determine whether the user has selected automated purchase. In response to determining the user has selected automated purchase, in operation 812 the smart inventory cloud system automatically purchases the product for the user. Otherwise in operation 814, the user is presented the short list of products to select a product to purchase.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. An autonomous distributed computing system comprising:
a conveyer belt configured to receive, support, and transport a physical object, wherein the physical object is associated with a machine-readable element encoded with an identifier corresponding to the physical object;
a scanner disposed with respect to the conveyer belt and configured to scan the machine-readable element of the physical object and decode the machine-readable element to extract the identifier;
an image capturing device disposed with respect to the conveyer belt and configured to capture an image of the physical object;
a scale operatively coupled to the conveyer belt and configured to determine a weight of the physical object;
a computing system including a server and a database operatively coupled to the scanner, the image capturing device, and the scale, the computing system being programmed to (i) query the database using the identifier extracted from the machine-readable element by the scanner to retrieve information regarding the physical object from one or more tables in the database, (ii) extract a set of attributes associated with the physical object from the image of the physical object, (iii) identify an element associated with the physical object based on the retrieved information regarding the physical object, the set of attributes associated with the physical object and the weight of the physical object, and (iv) automatically create a webpage associated with the physical object which was transported by the conveyer belt system, the webpage including the retrieved information, the set of attributes extracted from the image of the physical object, and the element, and
an autonomous robot picker configured to remove the physical object from packaging enclosing the physical object, subsequent to the scanner scanning the machine-readable element and prior to triggering the image capturing device to capture the image of the physical object,
wherein the set of attributes includes at least one of: estimated dimensions of the physical object, a condition of the physical object, or an age of the physical object.

2. The system in claim 1, wherein the information associated with the physical object includes at least one: a name of the physical object, a type of the physical object, a stored weight of the physical object, or stored dimensions of the physical object.

3. The system in claim 1, wherein the autonomous robot picker is operable to place the physical object on to the conveyer belt or remove the physical object from the conveyor belt.

4. The system in claim 3, wherein the machine-readable element is affixed to the packaging.

5. The system in claim 1, wherein the computing system inserts the image of the physical object captured by the image capturing device into the webpage.

6. The system in claim 1, wherein in response to identifying the element associated with the physical object based on the retrieved information regarding the physical object, the set of attributes associated with the physical object and the weight of the physical object, the element is stored in the database.

7. The system in claim 6, wherein the element stored in the database dynamically changes based on an input received by the computing system.

8. The system in claim 7, wherein in response to the element stored in the database dynamically changing based on an input received by the computing system, the webpage is updated to reflect the change in the element.

9. An autonomous distributed computing method comprising:
receiving, a physical object by a conveyor belt, the physical object being associated with a machine-readable element encoded with an identifier corresponding to the physical object;
transporting the physical object via the conveyer belt;
scanning, via a scanner disposed with respect to the conveyer belt, the machine-readable element of the physical object,
decoding, via the scanner, the machine-readable element to extract the identifier;
capturing, via an image capturing device disposed with respect to the conveyer belt, an image of the physical object;
determining, via a scale operatively coupled to the conveyer belt, a weight of the physical object;
querying, via a computing system including a server and a database operatively coupled to the scanner, the image capturing device, and the scale, the database using the identifier extracted from the machine-readable element by the scanner to retrieve information regarding the physical object from one or more tables in the database;
extracting, via the computing system, a set of attributes associated with the physical object from the image of the physical object;
identifying, via the computing system, an element associated with the physical object based on the retrieved information regarding the physical object, the set of attributes associated with the physical object and the weight of the physical object;
automatically creating, via the computing system, a webpage associated with the physical object which was transported by the conveyer belt system, the webpage including the retrieved information, the set of attributes extracted from the image of the physical object, and the element; and
removing, via an autonomous robot picker, the physical object from packaging enclosing the physical object, subsequent to the scanner scanning the machine-readable element and prior to triggering the image capturing device to capture the image of the physical object,
wherein the set of attributes includes at least one of: estimated dimensions of the physical object, a condition of the physical object, or an age of the physical object.

10. The method of claim 9, wherein the information associated with the physical object includes at least one: a name of the physical object, a type of the physical object, a stored weight of the physical object, or a stored dimensions of the physical object.

11. The method of claim 9, further comprising at least one of placing the physical object on to the conveyer belt by the autonomous robot picker or removing the physical object from the conveyor belt by the autonomous robot picker.

12. The method of claim 11, wherein the machine-readable element is affixed to the packaging.

13. The method of claim 9, further comprising inserting the image of the physical object captured by the image capturing device into the webpage.

14. The method of claim 9, wherein in response to identifying the element associated with the physical object based on the retrieved information regarding the physical object, the set of attributes associated with the physical object and the weight of the physical object, the method further comprises storing the element in the database by the computing system.

15. The method of claim 14, further comprising dynamically changing the element stored in the database based on an input received by the computing system.

16. The method of claim 15, wherein in response to the element stored in the database dynamically changing based on an input received by the computing system, the method further comprises updating the webpage to reflect the change in the element.

* * * * *